US008113005B2

(12) United States Patent
Götz et al.

(10) Patent No.: US 8,113,005 B2
(45) Date of Patent: Feb. 14, 2012

(54) JET ENGINE WITH DETACHABLY ARRANGED GENERATOR UNIT

(75) Inventors: Werner Götz, Lenting (DE); Hubert Herrmann, Haimhausen (DE)

(73) Assignee: MTU Aero Engines GmbH, Munich (DE)

( * ) Notice: Subject to any disclaimer, the term of this patent is extended or adjusted under 35 U.S.C. 154(b) by 626 days.

(21) Appl. No.: 12/243,625

(22) Filed: Oct. 1, 2008

(65) Prior Publication Data

US 2009/0165464 A1 Jul. 2, 2009

Related U.S. Application Data

(63) Continuation of application No. PCT/DE2007/000567, filed on Mar. 29, 2007.

(51) Int. Cl.
*F02C 6/00* (2006.01)
(52) U.S. Cl. .............................. 60/802; 290/52; 60/786
(58) Field of Classification Search .................. 60/802, 60/786, 796, 797, 798, 788, 787; 290/52
See application file for complete search history.

(56) References Cited

U.S. PATENT DOCUMENTS

| 3,185,854 | A | * | 5/1965 | Hoffman | 290/52 |
|---|---|---|---|---|---|
| 3,548,565 | A | * | 12/1970 | Toesca | 60/772 |
| 3,696,612 | A | * | 10/1972 | Berman | 60/786 |
| 3,859,785 | A | | 1/1975 | Leto et al. | |
| 4,062,185 | A | * | 12/1977 | Snow | 60/204 |
| 4,301,375 | A | * | 11/1981 | Anderson | 290/1 R |
| 4,380,897 | A | * | 4/1983 | Zaba | 60/802 |
| 5,687,561 | A | * | 11/1997 | Newton | 60/226.1 |
| 6,739,845 | B2 | * | 5/2004 | Woollenweber | 417/407 |
| 7,500,365 | B2 | * | 3/2009 | Suciu et al. | 60/802 |
| 7,692,326 | B2 | * | 4/2010 | Ono et al. | 290/52 |
| 7,805,947 | B2 | * | 10/2010 | Moulebhar | 60/787 |
| 2001/0003242 | A1 | * | 6/2001 | Takamatsu et al. | 60/39.33 |
| 2004/0025509 | A1 | | 2/2004 | Lawlor et al. | |
| 2006/0101804 | A1 | * | 5/2006 | Stretton | 60/226.1 |

FOREIGN PATENT DOCUMENTS

| WO | WO 95/02120 | 1/1995 |
|---|---|---|
| WO | WO 99/28599 | 6/1999 |
| WO | WO 2004/055339 | 7/2004 |

OTHER PUBLICATIONS

International Search Report corresponding to International Application Serial No. PCT/DE2007/000567, mailed Jul. 19, 2007.

* cited by examiner

*Primary Examiner* — William H Rodriguez
(74) *Attorney, Agent, or Firm* — McAndrews, Held & Malloy, Ltd.

(57) ABSTRACT

The present technology generally relates to jet engines, in particular for an aircraft, having at least one turbine shaft on which at least one compressor and a turbine are arranged, and a housing extends over the lateral surfaces of the jet engine, wherein furthermore at least one electrical generator unit for generating electricity is arranged on at least one turbine shaft, wherein the electrical generator unit has a locating plate and a generator, wherein the generator unit is detachably mounted on the engine-side locating plate. Therefore, a jet engine having a generator unit is provided which permits simple installation, removal and servicing of the generator unit in or out of the jet engine.

14 Claims, 3 Drawing Sheets

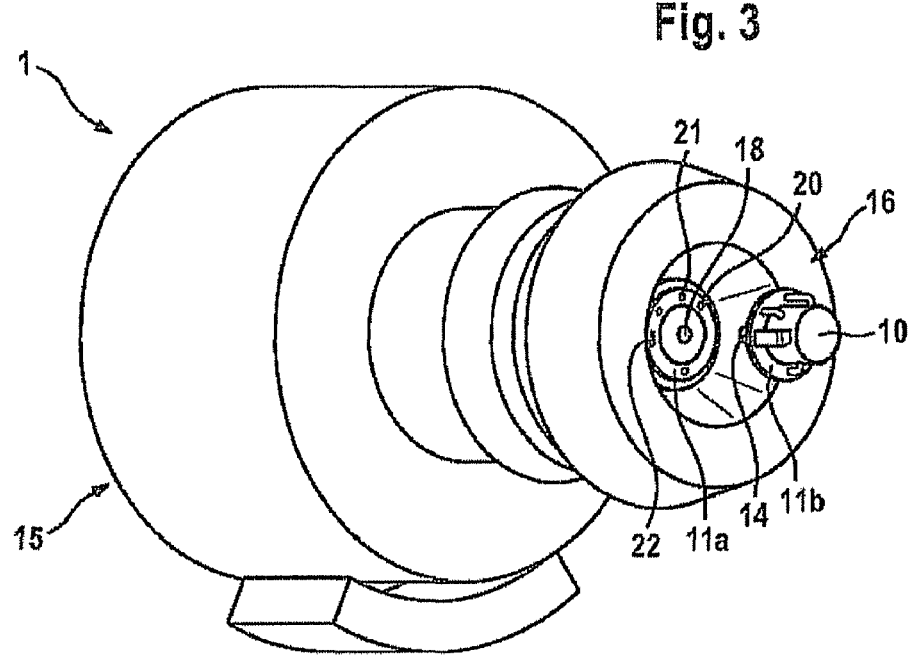
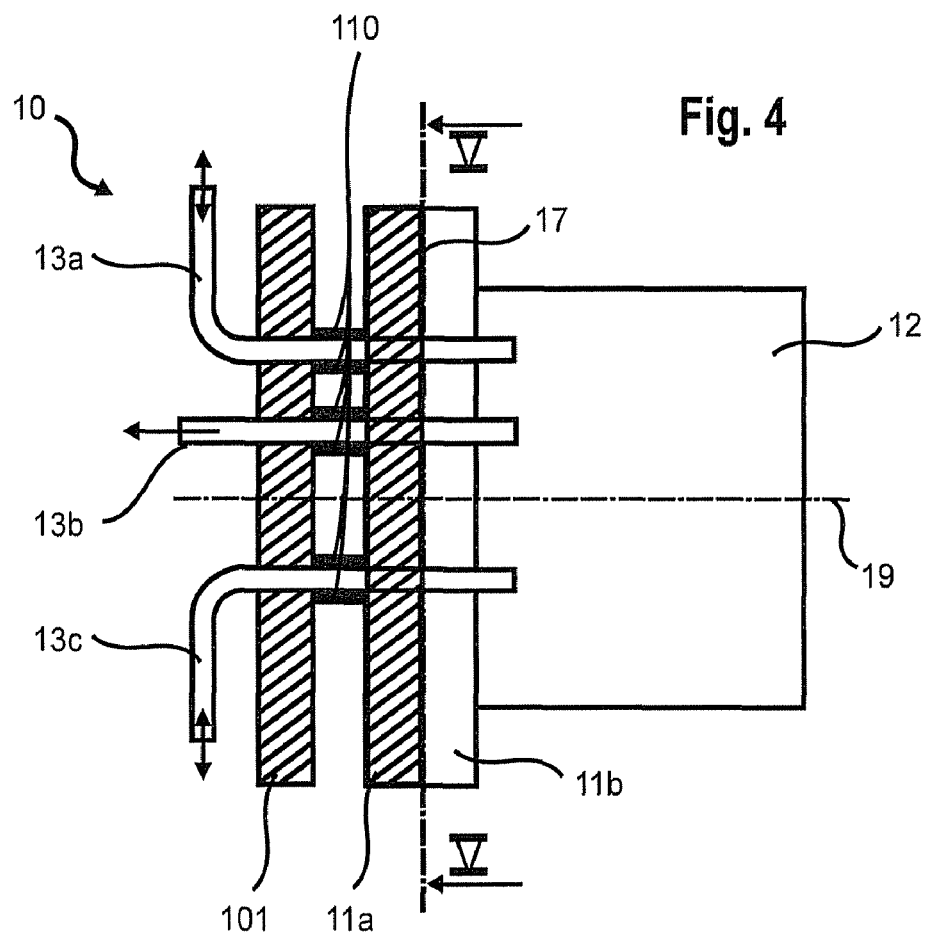

US 8,113,005 B2

JET ENGINE WITH DETACHABLY ARRANGED GENERATOR UNIT

RELATED APPLICATIONS

This application is a continuation of International Application Serial No. PCT/DE2007/000567 (International Publication Number WO 2007/112726), having an International filing date of Mar. 29, 2007 entitled "Strahltriebwerk Mit Lösbar Angeordneter Generatoreinheit" ("Jet Engine with Detachably Arranged Generator Unit"). International Application No. PCT/DE2007/000567 claimed priority benefits, in turn, from German Patent Application No. 10 2006 015 639.0, filed Apr. 4, 2006. International Application No. PCT/DE2007/000567 and German Application No. 10 2006 015 639.0 are hereby incorporated by reference herein in their entireties.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The presently described technology relates to a jet engine. In particular, the present technology relates to jet engines for an aircraft.

Jet engines for an aircraft often have generator units that are arranged on at least one of the turbine shafts. The generator units are arranged in order, through linking, to tap mechanical power and convert it into electrical power. In this arrangement, the jet engine can be operated in connection an aircraft, or as a stationary jet engine. The electrical power generated can be used to facilitate operation of different electrical equipment of the engine and the aircraft. Recent developments in this field indicate that the amount of electric power demanded by the engine and the aircraft is increasing due to the increased electrification of various assemblies. These various electrical assemblies presently use mechanically driven devices, such as fuel pumps or hydraulic pumps, and are often driven using device carriers, or "gearboxes." In the future, however, many of these devices will be able to be driven electrically. Additionally, the amount of electrical power required for use on board the aircraft is continually increasing.

The jet engine of the present technology particularly involves a fan engine designed as a two-shaft engine, where the fan serves as a blower causing preliminary compression of the air flowing into the engine as well as by-pass flow around the hot exhaust stream.

Also known in the art are single-shaft systems having multi-axle compressors placed on the front side and in the rear area have a single or multiple axle turbine. A jet engine of this general type is generally described in United States Publication No. 2002/0122723 A1 as having a generator integrated in the high pressure compressor of the jet engine. The jet engine has compressor stages that are shrouded, whereby an electrical generator is located outside the shroud. It consists of a stator, which comprises an electrical coil and a rotor that is connected to the engine shaft in such a way that is executes a rotation movement. The rotor arrangement executes a rotation movement inside the stator and induces an electrical voltage in the stator coil. In this case, the rotor elements are arranged on the outside on the blade elements of the high pressure compressor and extend radially outward into the stator of the generator.

Another arrangement of a generator inside a jet engine is described in U.S. Pat. No. 6,378,293 B1. In this patent, a jet engine is described as having a number of shafts, each of which connects the compressors to the assigned turbines of the jet engine. The generator for generating the electrical power is fed by electromagnetic bearings and delivers a partial power for supplying the aircraft. The generator is arranged far from the respective electromagnetic bearings and designed as a separate unit. The drive of the generator is produced by the connection of the low pressure shaft of the jet engine. In this case, the fluid connections must generally be produced using complicated connecting devices for connecting cable and/or fluid lines and must be disconnected again upon removal. The result is disadvantageous, as it leads to an increase in maintenance and assembly effort, which also causes a considerable increase in costs of initial placement assembly, maintenance and repair.

Problems occur with the presently known generator to shaft of the jet engine arrangements because the installation location of the generators are difficult to access, thereby causing problems, in particular in the area of the high pressure compressor, due to the limited installation conditions. Even with a one-sided attachment of the generator to the low pressure shaft, the installation options, the maintenance and production of corresponding fluid, and the mechanical and electrical connections of the generator with the jet engine and/or with the aircraft are extremely difficult. Because of this, the maintenance effort and the assembly effort are considerably increased, making replacement of the generator very complicated. During assembly or disassembly of the generator, the generator must first be mechanically loosened from the low pressure shaft, whereby both electrical and fluid connections must generally be loosened using complicated connecting devices like cables and pressure lines. The mechanical connection between the engine shaft and the generator in most cases comprises a shaft coupling, which also requires a complicated installation and/or removal.

BRIEF SUMMARY OF THE INVENTION

The presently described technology generally relates to a jet engine. In particular, the present technology relates to jet engines for an aircraft. In certain embodiments, the engine has at least one turbine shaft on which at least one compressor and one turbine are arranged. In certain embodiments, a housing extends preferably over the lateral surfaces of the jet engine, and at least one electrical generator unit is arranged on at least one turbine shaft for power generation.

Certain aspects of the present technology provide a jet engine with a generator unit, making possible simple installation and removal of the generator unit into and/or from the jet engine. Certain aspects of the present technology help to minimize the effort necessary to maintain the generator.

These aspects are achieved by various advantageous embodiments of a jet engine described and claimed herein. These aspects are also achieved by various advantageous embodiments of the jet engine described and claimed herein.

BRIEF DESCRIPTION OF SEVERAL VIEWS OF THE DRAWINGS

FIG. 3 shows a perspective view of a jet engine with an electrical generator unit, whereby the generator is shown separately from the locating plate on the engine side; and FIG. 4 shows a schematic view of the generator unit, in which it is arranged on the locating plate on the engine side, whereby the connectors are indicated in the transition through the multifunction coupling.

Figure 1:
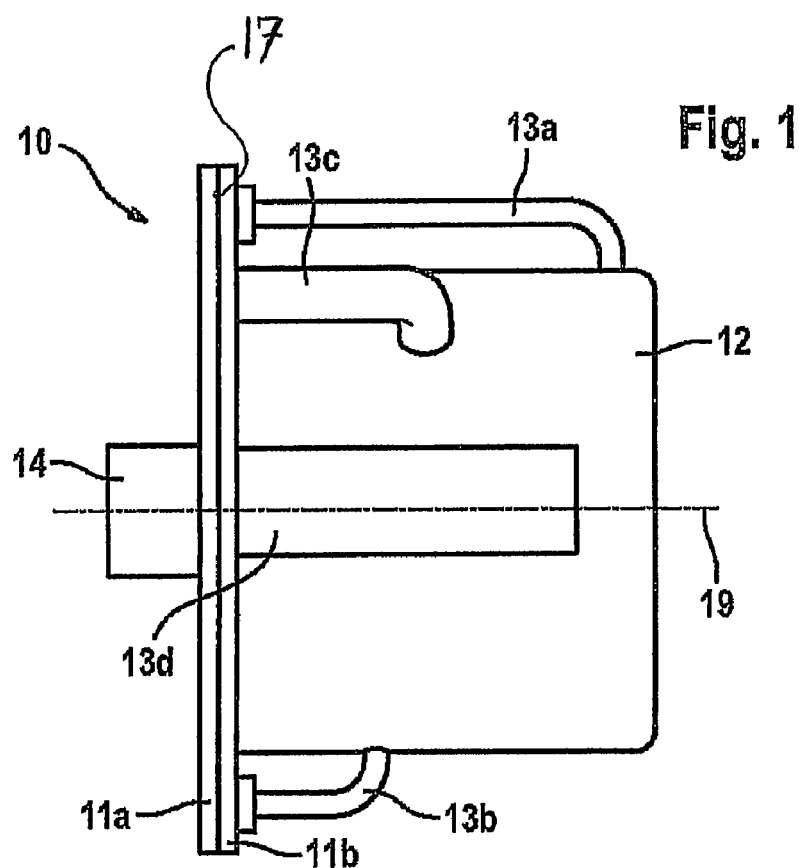
FIG. 1 shows a side view of an electrical generator unit with a locating plate that has a generator mounted on it.

The figures involve only an exemplary technical design of the present technology.

DETAILED DESCRIPTION OF THE INVENTION

Certain embodiments of the present technology provide an electrical generator unit having a locating plate and a generator, whereby the generator unit is mounted detachably on the locating plate on the engine side.

The present technology is based on the concept that the generator unit for power generation has an interface that connects the generator unit tightly with the locating plate on the engine side forming the other half of the multi-function coupling. On the other side, the generator shaft is coupled to the turbine shaft by way of a direct or indirect (intermediate gear) connection. For this purpose, the locating plate on the engine side is provided with a hole that is larger than the generator shaft. For simpler installation/removal of the generator shaft with the locating plate on the engine side, at least one centering pin engages between the two units to be connected before any of the other elements engage with each other.

The generator unit can be arranged on the turbine shaft in the front area on the compressor side, or in the rear area on the turbine side of the jet engine. In certain embodiments, a generator can be provided at each of the installation positions. The generator unit can be installed in the so-called nose cone and inlet guide grid in the compressor side arranged on the front side. The installation location on the rear side of the turbine can be provided in the so-called exit cone and outlet nozzle guide. Installation on the compressor side offers the advantage of lower temperatures.

The mechanical connection of the drive can also connect another turbine shaft to the generator, which can additionally comprise a gear stage. During installation of the electrical generator unit, the locating plate on the engine side is installed, fixed in the inlet and/or outlet guide of the jet engine, and the electrical, fluid and mechanical connections are produced within a multifunction coupling. The generator-side of the multifunction coupling contains the same function parts in mirror image, so that in the coupled state of the installed generator the electrical and the fluid streams can flow unimpeded. The coupling half on the generator can either be a flange-like integral component of the generator, or it can be mounted on it as a separate component. The connection of the couplings provides a multifunctional connection that self-locks the two halves together while providing a fluid electrical connection between the respective modules, whereby the respective lines are run out the back for coupling.

If the generator installed in the electrical generator unit has to be removed and/or replaced with another generator, the generator need only be disconnected from the locating plate, whereby the respective connections can be designed simply and do not require complicated installation or removal. This produces a considerable simplification of the maintenance of such componentry since the generator can be designed in a modular manner and can simply be removed for maintenance by a simple removal from the generator-side locating plate.

To enable the connection of the electrical and fluid lines between the locating plate on the engine side and the non-rotating areas in the engine, the locating plate is arranged on a stator of the jet engine, whereby the stator comprises hollow ribs through which electrical and/or fluid lines can be passed. In particular, the heat-sensitive electrical line can be passed through the hollow cavities (with additional heat insulation if necessary) of the rib-like structures of the stator elements, while mechanical connections that are routed inside the stator cavities enables for the mechanical mounting of the connecting plate in the engine.

In certain embodiments, the fluid connectors are designed so they are self-closing, which prevents escape of fluids when disconnected. This allows for a clean, loss-free removal process so that the self-closing connections can be secured by appropriately designed coupling elements in view of the limited spatial conditions which will be appreciated by those skilled in the art. If the connectors are each decoupled, free fluid flow is possible, whereby with a decoupling of the connections both on the locating plate side and also on the generator side, a valve-like blocking device prevents both an escape of the respective fluid and a penetration of contamination into the pipe lines. In this case, the fluid can comprise essentially cooling fluid in order to connect the generator to a cooling circuit. The electrical connections can comprise plug connections so that these also do not require separate disconnection or reconnection.

Certain embodiments of the present technology provide connections having gaskets formed as O-rings. This provides a sealing variation, whereby with appropriate designed plug connectors, other sealing devices can be used.

In certain embodiments, the connections have high-current contacts in order to produce an electrical connection between the generator and the engine and/or the aircraft. The current carrying capability of the high-current contact can be up to 500 A, whereby the electrical contacts are maintained a high safety level.

In addition to the electrical power connections, the connectors may have control contacts for controlling the generator and/or bus system contacts for control/feedback of the generator parameters. Thus, the electrical connectors also comprise signal connections, which are guided by way of separate connecting elements between the connecting plate and the generator.

In certain embodiments designed for producing high flexibility, the installation interface of the locating plate can be designed in a modular manner to make possible the installation of generators of different construction types. In these embodiments, for example, the generators can also be designed as generator modules, each having the same interface to be able to be mounted or held on a standardized locating plate. The different construction types of the generators can comprise synchronous, asynchronous or reluctance construction methods, which can be preferably suitable for generators described herein.

In certain preferred embodiments of the present technology, the driving connection between the turbine shaft and the generator shaft is provided as a multipoint connection. The generator shaft can be a hollow shaft and runs through an opening in the connecting plates. The connecting plates can be coupled with the shaft end of the turbine shaft, whereby the turbine shaft is mounted in the stator of the turbine. The coupling of the two shafts is then secured by the connection of the generator flange to the engine-side connecting plate.

In certain embodiments, the multipoint shaft connection can be curved, or arc-shaped, for example, making both axial and slight radial movements of the turbine shaft possible. Thus, it can be possible to simply thread in, or pull out the generator unit during installation or removal without the need for additional equipment.

In certain embodiments, it can be advantageous for the mounting of the entire electrical generator unit, to form a cylindrical cavity for the installation space of the generator, whereby the cavity has a diameter only slightly larger than the outer diameter of the locating plate. This technique forms a pot-shaped hollow cylinder having the locating plate so that the generator may be arranged inside the hollow cylinder. This produces a type of housing to protect the generator, especially from the hot exhaust stream of the jet engine. Accordingly, the cylindrical cavity forming the installation space can have high temperature insulation to protect the electrical generator unit from high temperature in the rear air outlet area. The high temperature insulations provided thereby shroud the generator, preferably with non-flammable materials, or materials having low flammability.

Variations in the embodiments and/or improvements provided by the present technology will be described in further detail using reference to the figures together with the description of an exemplary embodiment of the present technology.

FIG. 1 depicts an uncut, exterior view of an electrical generator unit 10. The schematic representation comprises the engine-side locating plate 11a of the multifunction coupling 17 on the left side and the generator-side locating plate 11b of the multifunction coupling 17 on the right side. The two locating plates are designed so that they are circular and contain the corresponding electrical connector modules and the self-closing fluid coupling halves that are not visible here. On the right side of the multifunction coupling 17, the generator 12 is arranged in a cylindrical shape, and a center axis 19 concentrically changes over into the generator-side half of the multifunction coupling 17. Between the generator 12 and the locating plate 11b, there are connecting lines 13a, 13b, 13c and 13d, which comprise current supply lines, signal lines for sensors, BUS lines and fluid lines, which carry, for example, cooling fluid for cooling the generator 12. The lines mentioned above are coupled to each other by way of the multifunction coupling 17, in order to then be guided outward on the back side of the engine-side locating plate 11a through the hollow ribs 110 of the stator through the engine 101. The generator shaft 14 for coupling to the engine shaft extends through a hole in the multifunction coupling 17 that is concentric to the center axis 19.

Figure 2:
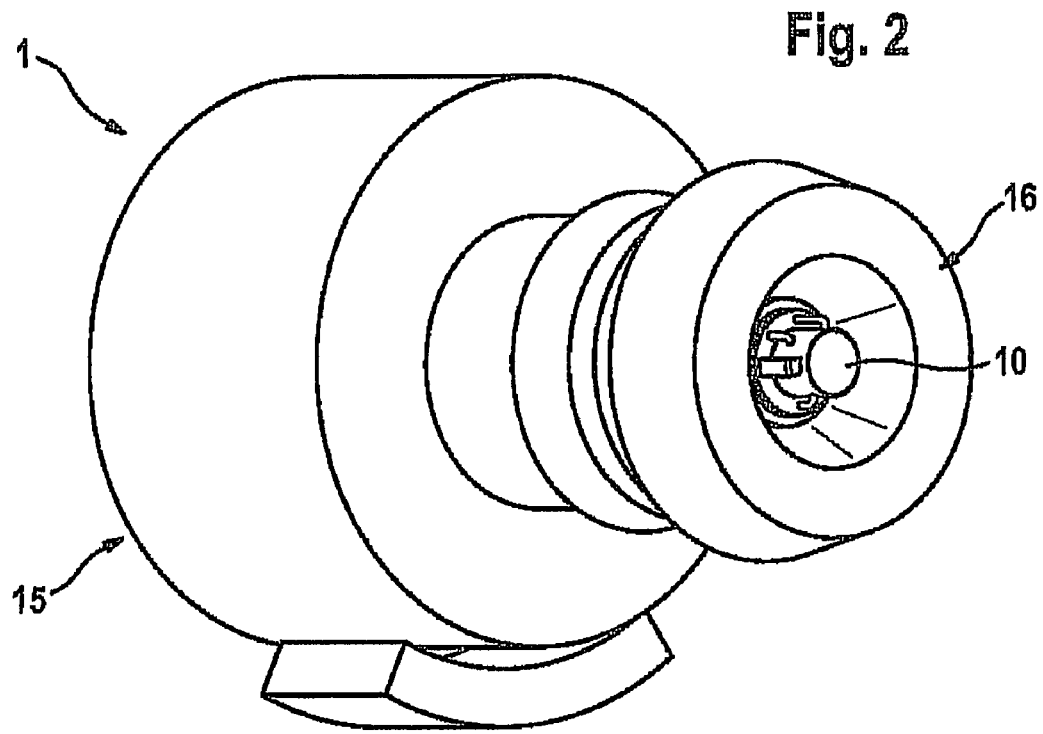
FIG. 2 shows a perspective view of a jet engine with an electrical generator unit in assembled state.

FIG. 2 and FIG. 3 show a perspective view of a jet engine 1 according to at least one embodiment of the present technology. The jet engine 1 comprises a front air inlet area 15 and a rear air outlet area 16. The diameter of the housing of jet engine 1 is designed larger in the area of the front air inlet area 15 since the fan is integrated here. In the rear air outlet area 16, the engine has a smaller diameter, whereby the rear air outlet area 16 offers the installation space on the inside in which the electrical generator unit 10 is installed according to at least the present exemplary embodiment. FIG. 2 shows the electrical generator unit 10 in an installed state, while FIG. 3 shows a perspective view of electrical generator unit 10 in front of the actual installation location inside the rear air outlet area 16 of the jet engine 1. Accordingly, the engine-side locating plate 11a is visible in FIG. 3, and is shown comprising fluid couplings 20, the modular sensor line connector 21 and the modular power current connector 22. In addition, the generator shaft 4 is visible, which is arranged opposite the turbine shaft 18 and is connected to it by means of a coupling or other shaft connection.

FIG. 4 schematically shows the connection of the generator unit 10 (12 and 11b) to the locating plate 11a mounted on the engine side. In the parting plane between the locating plate 11a that is shown as shaded, and the flange-shaped connecting location 11b of generator 12, the actual connecting elements are formed, by way of which the connecting lines 13a, 13b and 13c are coupled. The connecting lines involve both electrical lines, such as signal, bus and supply current lines, as well as fluid lines for guiding the cooling fluid.

Figure 5:
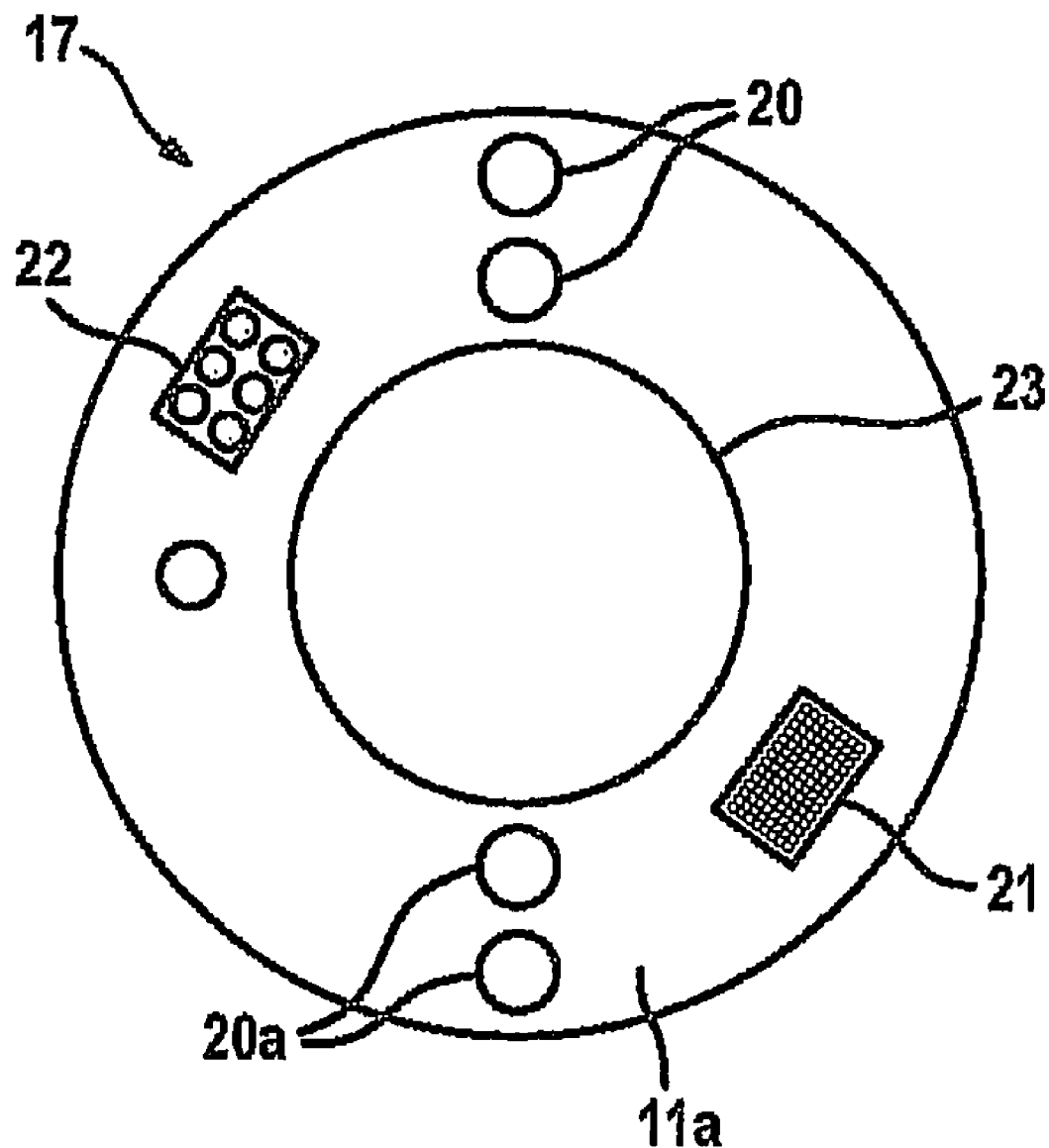
FIG. 5 shows a schematic view of the multifunction coupling in the parting plane V-V from FIG. 4.

A top view of one half of the multifunction coupling 17 is shown in the schematic view in FIG. 5. The coupling 17 comprises the fluid couplings 20 and 20a, which form the supply and return for the cooling fluid between the engine and the generator. In addition, a modular sensor line connector and BUS 21 are provided for signal connection of the generator and a modular supply current connector 22, which transfers the supply current to the engine and/or the aircraft. The multifunction coupling is formed as a mirror image of the flange of the generator 11b and in the connecting plate 11a, so that the modular connectors 21 and 22 and the fluid couplings 20 and 20a engage in the respective opposing connector or in the opposing coupling.

The design of the present technology is not restricted to the exemplary embodiments described herein. Rather a number of variations are conceivable and shall be appreciated by those skilled in the art that make use of the solution shown even with versions that are designed using different embodiments or designs.

The present technology has now been described in such full, clear, concise and exact terms as to enable a person familiar in the art to which it pertains, to practice the same. It is to be understood that the foregoing describes preferred embodiments and examples of the present technology and that modifications may be made therein without departing from the spirit or scope of the present technology as set forth in the claims. Moreover, while particular elements, embodiments and applications of the present technology have been shown and described, it will be understood, of course, that the present technology is not limited thereto since modifications can be made by those familiar in the art without departing from the scope of the present disclosure, particularly in light of the foregoing teachings and appended claims. Moreover, it is also understood that the embodiments shown in the drawings, if any, and as described above are merely for illustrative purposes and not intended to limit the scope of the present technology, which is defined by the following claims as interpreted according to the principles of patent law, including the Doctrine of Equivalents. Further, all references cited herein are incorporated in their entirety.

The invention claimed is:

1. A jet engine for operation in an aircraft having at least one lateral surface, the jet engine comprising:
   at least one turbine shaft;
   at least one compressor arranged on the turbine shaft;
   at least one turbine arranged on the turbine shaft;
   a housing extending over the at least one lateral surface of the jet engine; and
   at least one electrical generator unit for power generation arranged on the at least one turbine shaft, the electrical generator unit comprising at least one generator-side locating plate and at least one generator;
   wherein the electrical generator unit is detachably mounted to an engine-side locating plate on the jet engine and further wherein the engine-side locating plate is arranged on a stator of the jet engine, wherein the stator comprises hollow ribs through which at least one of electrical or fluid lines are capable of being passed.

2. The jet engine of claim 1, wherein the generator unit is mounted on at least one of the compressor at the front of the jet engine, or on the turbine shaft on the turbine side in the rear area of the jet engine.

3. The jet engine of claim 1, wherein the engine-side locating plate has connectors for detachably coupling the generator unit to the jet engine, wherein the connectors comprise at least one mechanical receiver, a drive connection and at least one of an electrical or a fluid connection.

4. A jet engine for operation in an aircraft having at least one lateral surface, the jet engine comprising:
at least one turbine shaft;
at least one compressor arranged on the turbine shaft;
at least one turbine arranged on the turbine shaft;
a housing extending over the at least one lateral surface of the jet engine; and
at least one electrical generator unit for power generation arranged on the at least one turbine shaft, the electrical generator unit comprising at least one generator-side locating plate and at least one generator;
wherein the electrical generator unit is detachably mounted to an engine-side locating plate on the jet engine and further wherein the engine-side locating plate has connectors for detachably coupling the generator unit to the jet engine, wherein the connectors comprise at least one mechanical receiver, a drive connection and at least one of an electrical or a fluid connection.

5. The jet engine of claim 4, wherein the connectors are self-closing, wherein, when the connectors are separated, fluid is prevented or at least partially prevented from flowing from the connectors.

6. The jet engine of claim 4, wherein the connectors have gaskets.

7. The jet engine of claim 6, wherein the gaskets are O-rings.

8. The jet engine of claim 4, wherein the connectors have detachable, high-current electrical contacts for producing an electrical connection from the generator to at least one of the jet engine or the aircraft.

9. The jet engine of claim 4, wherein the connectors further comprise control contacts for controlling the generator.

10. The jet engine of claim 4, wherein the connectors further comprise bus system contacts for controlling or receiving feedback from the generator.

11. The jet engine of claim 4, wherein the engine-side locating plate has an assembly interface, wherein the assembly interface of the engine-side locating plate is modular to enable connection with a plurality of generator unit construction types.

12. The jet engine of claim 4, wherein the drive connection between the engine-side drive shaft and the generator shaft comprises a multipoint connection.

13. The jet engine of claim 12, wherein the multipoint connection of the drive connection is curved, or arc-shaped.

14. A jet engine for operation in an aircraft having at least one lateral surface, the jet engine comprising:
at least one turbine shaft;
at least one compressor arranged on the turbine shaft;
at least one turbine arranged on the turbine shaft;
a housing extending over the at least one lateral surface of the jet engine; and
at least one electrical generator unit for power generation arranged on the at least one turbine shaft, the electrical generator unit comprising at least one generator-side locating plate and at least one generator;
wherein the electrical generator unit is detachably mounted to an engine-side locating plate on the jet engine and further wherein the engine-side locating plate has an assembly interface, wherein the assembly interface of the engine-side locating plate is modular to enable connection with a plurality of generator unit construction types.

* * * * *